United States Patent [19]

Schuldies

[11] Patent Number: 5,177,037
[45] Date of Patent: Jan. 5, 1993

[54] HIGH FRACTURE TOUGHNESS ELECTRO-DISCHARGE MACHINEABLE CERAMIC WHISKER REINFORCED CERAMIC COMPOSITES AND TOOLING MADE THEREFROM

[75] Inventor: John J. Schuldies, Pinckney, Mich.

[73] Assignee: Industrial Ceramic Technology, Inc., Ann Arbor, Mich.

[21] Appl. No.: 703,395

[22] Filed: May 21, 1991

[51] Int. Cl.$^5$ ............................................. C04B 35/56
[52] U.S. Cl. ........................................ 51/309; 501/89; 501/91; 501/92; 501/95; 501/96; 501/97
[58] Field of Search ....................... 501/89, 91, 92, 95, 501/96, 97; 51/309

[56] References Cited

U.S. PATENT DOCUMENTS

| Re. 32,843 | 1/1989 | Wei | 501/95 |
|---|---|---|---|
| 2,806,800 | 9/1957 | Glaser | 106/43 |
| 3,808,012 | 4/1974 | Bailey et al. | 106/44 |
| 4,104,075 | 8/1978 | Hayashi et al. | 106/44 |
| 4,110,260 | 8/1978 | Yamamoto | 252/519 |
| 4,158,687 | 6/1979 | Yajima et al. | 264/60 |
| 4,463,058 | 7/1984 | Hood et al. | 501/89 |
| 4,507,224 | 3/1985 | Toibana et al. | 501/89 |
| 4,528,121 | 7/1985 | Matsushita | 252/516 |
| 4,543,343 | 9/1985 | Iyori | 501/87 |
| 4,555,358 | 11/1985 | Matsushita | 252/516 |
| 4,612,296 | 9/1986 | Sakamoto | 501/93 |
| 4,613,455 | 9/1986 | Suzuki | 252/516 |
| 4,636,481 | 1/1987 | Kida | 501/96 |
| 4,657,877 | 4/1987 | Becher | 501/89 |
| 4,767,727 | 8/1988 | Claussen | 501/87 |
| 4,777,155 | 10/1988 | Baba | 501/87 |
| 4,820,663 | 4/1989 | Mehrotra | 501/87 |
| 4,852,999 | 8/1989 | Mehrotra | 51/309 |
| 4,867,761 | 9/1989 | Brandt et al. | 501/89 |
| 4,916,092 | 4/1990 | Tiegs | 501/89 |
| 4,961,757 | 10/1990 | Rhodes | 51/89 |
| 5,024,976 | 6/1991 | Mehrotra et al. | 501/89 |

OTHER PUBLICATIONS

Firestone Lasers and Other Nonabrasive Machining Methods for Ceramics, 1987, SME Technical Paper MR87-112.

Dauw, The Machining of Electrically Conductive Ceramics by EDM, 1988, Worldwide Engineering Services Meeting.

Primary Examiner—Karl Group
Assistant Examiner—Chris Gallo
Attorney, Agent, or Firm—James M. Deimen

[57] ABSTRACT

An electro-conductive ceramic comprising a non-electroconductive matrix ceramic, an electro-conductive ceramic in relatively large proportion to permit efficient electro-discharge machining (EDM) of the ceramic and ceramic whiskers of low aspect ratio and short length dispersed in the ceramic body to provide high fracture toughness, stength and hardness despite the relatively large proportion of electro-conductive ceramic. Complex geometries and features such as holes, chamfers, slots, angles, changing radii an complex curves can be electro-discharge machined into the ceramic body after hot processing or hot-isostatic pressing to achieve maximum density and mechanical properties. A particularly advantageous high temperature extrusion die, powder metal compacting die hardware and cutting tools formed of $Al_2O_3$, TiC and SiC whiskers have been produced and tested. Test results show that the detrimental surface damage caused by the electro-discharge machining process can be overcome with larger proportions of relatively small single crystal ceamic whiskers of low aspect ratio and short length thoroughly dispersed in the matrix.

20 Claims, No Drawings

HIGH FRACTURE TOUGHNESS ELECTRO-DISCHARGE MACHINEABLE CERAMIC WHISKER REINFORCED CERAMIC COMPOSITES AND TOOLING MADE THEREFROM

BACKGROUND OF THE INVENTION

The field of the invention pertains to very hard, very tough ceramic materials for industrial tooling, and, in particular, to ceramic materials that can be formed into high temperature cutting tools, extrusion and drawing dies and wear parts.

Beginning about sixty years ago a variety of "engineered" ceramic materials having important industrial advantages, particularly in tooling, have been developed. Typically, particles of ceramic have been bonded together at low temperature with a resinous material or at a high temperature with a metal or other ceramic. Carbide grinding wheels are an example. Or the ceramic constituents have been combined at low temperature and hot pressed or sintered in a variety of processes for cutting tools and wear parts. Numerous patents have issued with the following of particular relevance to the invention disclosed below.

U.S. Pat. No. 4,104,075 discloses TiN based refractories with or without TiC, SiC and $Al_2O_3$ as ingredients, and methods for using ores to react and form the ceramics into a bonded composite. Coarse refractory grains are retained in the matrix. U.S. Pat. No. 4,158,687 discloses a method for making ceramic composites containing continuous fibers of SiC. The continuous fibers are in preference to SiC whiskers which at the time of the patent were not of uniform quality and therefore produced inferior whisker reinforced ceramic products. In the intervening years since this patent, SiC whiskers have become available in uniformly good quality. As a result composite ceramics reinforced with Sic whiskers have been developed such as disclosed in U.S. Pat. No. Re. 32,843 wherein the whiskers are combined with $Al_2O_3$, mullite or $B_4C$.

As an alternative U.S. Pat. No. 4,612,296 discloses $Si_3N_4$ ceramics with silicides and carbides of a variety of metals added to the matrix in small plate form before sintering. The small plates are added to improve the toughness of the sintered body. TiN and TiC are included as toughening agents in small plate form. However, the use of SiC whiskers with surfaces treated to remove oxides and to add a carbon coating are disclosed in U.S. Pat. No. 4,916,092. The treatment purposely causes a lack of chemical bonding between the whiskers and the matrix thereby causing propagating cracks to deflect. The result is a tougher ceramic having only intermediate strength.

U.S. Pat. No. 4,867,761 discloses $Al_2O_3$ cutting inserts reinforced with SiC whiskers limited to less than 15% by volume and the balance of the whiskers of titanium or zirconium nitrides or borides. However, the examples disclosed used TiN whiskers exclusively. The TiN whiskers are added to increase the toughness of the cutting inserts in cutting steel. U.S. Pat. No. 4,852,999 discloses TiC whiskers in an $Al_2O_3$ matrix for cutting inserts with increased fracture toughness in cutting steel.

As a part of the development of ceramic engineered materials in recent years, electrically conducting ceramics have evolved. U.S. Pat. No. 3,808,012 discloses an electrically conducting ceramic of $TiB_2$, $B_4C$ and SiC and several methods of forming the ceramic into useful shapes. More recently patents have issued disclosing ceramic electrically conductive heaters. U.S. Pat. No. 4,528,121 discloses such a ceramic of predominantly $Al_2O_3$ with TiN, TiC, $TiB_2$ or other metallic compounds to impart electrical conductivity. U.S. Pat. No. 4,555,358 discloses SiC ceramic heater with zirconium or titanium borides and nitrides added to impart electrical conductivity. And U.S. Pat. No. 4,613,455 discloses $Si_3N_4$ ceramic heaters with TiN and TiC added to impart electrical conductivity.

U.S. Pat. No. 4,507,224 discloses two varieties of electro-conductive ceramics specifically for electro-discharge machining. The first variety of electro-conductive ceramic comprises the addition of 5 to 50% by weight of dispersed SiC whiskers in a matrix of oxide ceramics, the whiskers ranging 10 to 50 microns in length. Surprisingly, this combination is disclosed to be exceptionally electro-conductive despite the very high resistivity of both the ceramic oxides and SiC whiskers. At the time this technology was developed, available SiC whiskers were highly contaminated with metal residues from the manufacturing process which may explain the electro-conductivity found and disclosed.

The second variety disclosed in U.S. Pat. No. 4,507,224 includes the further addition of electro-conductive carbides, nitrides and borides in a range of 2 to 20% by weight. The electro-conductive carbides, nitrides and borides are limited to 20% by weight because of the deleterious effect on strength. In both varieties the preferred range of SiC whisker length is 50 to 500 microns with lengths less than 10 microns considered deleterious because the large amount of SiC whiskers added to achieve electro-conductivity impairs the inherent properties of the ceramic if the short lengths of whiskers are used. Likewise the patent teaches whisker diameters of 0.1 to 10 microns with 0.5 to 3 microns preferred.

Since 1985, the manufacturers of raw SiC whiskers have significantly improved overall quality in terms of amount of non-whisker material, contaminants, chemistry and trace elements or compounds. Most dramatic has been the reduction in metal contaminants such as Fe, Cr, Ni, Mg and notably Co. Current SiC whiskers have very high inherent electrical resistance due to the low level of metal content, on the order of 0.02–0.03 wt. percent. An alumina composite containing 50 volume percent SiC whiskers of this cleanliness has exhibited a bulk resistance of $10^6$ ohm-cm versus the 10 ohm-cm disclosed in U.S. Pat. No. 4,507,224. An electrical resistance range of $10^2$–$10^4$ ohm-cm is typical for currently produced 40 volume percent SiC whiskers in an alumina matrix powder.

Accordingly, it is necessary to add an electro-conductive compound to the non-electroconductive matrix in order to sufficiently reduce bulk resistance and achieve reasonable electro-discharge machining cutting rates. U.S. Pat. No. 4,507,224 teaches that additions above 20 weight percent cause an apparent rapid decrease in strength. Thus, electroconductive additions are limited to 20 weight percent or less and, in turn, the rate of electro-discharge machining is likewise limited.

In electro-discharge machining the electrically conductive workpiece or ceramic blank is eroded by electric discharges or sparks which on a small scale generate localized shock waves and intense heat. The shock waves and intense heat thermally erode the adjacent workpiece surface. The thermal erosion process comprises the separation of solid particles through melting and vaporization selectively of compounds in the workpiece or ceramic blank. The violence of the process generates micro-cracks in the workpiece surface as particles are removed and cavitation occurs in the dielectric liquid surrounding the workpiece and electro-discharge machining electrode.

The generation of surface micro-cracks is detrimental to strength in the ceramic if the surface cracks exceed about 50 microns in depth. Appreciable useful strength is lost during the electro-discharge machining of electro-conductive ceramics as reported by Firestone, SME Technical Paper MR 87-112,1987. A limitation on thin-wall sections of about 0.040 inches due to the fragile nature of the post electro-discharge machined sections has been reported by Dauw, The Machining of Electrically Conductive Ceramics by EDM, Worldwide Engineering Services Meeting 1988, Ferney-Voltaire (France).

Micro-crack initiation and propagation in ceramic materials may be significantly reduced as disclosed in U.S. Pat. No. 4,543,345 (Re 32,843). This patent also identifies means of achieving properly dispersed SiC whiskers in ceramic powders as does U.S. Pat. No. 4,463,058. Known prior art patents, however, do not discuss nor disclose the microscopic aspects of fracture toughness in ceramic composites in relation to electro-discharge machining nor do they discuss toughness levels obtained in the ceramic composites disclosed.

The ceramic materials disclosed above are very hard subsequent to sintering or hot pressing therefore final shaping is generally limited to diamond grinding and ultrasonic machining. Diamond grinding and ultrasonic machining are costly and limited to relatively uncomplicated shapes. Furthermore the addition of electrically conductive ceramic materials typically compromises the fracture toughness and strength of the ceramic. For purposes of ceramic heaters and glow plugs some compromise of toughness and strength is permissible. Resistance to high temperature and chemical degradation are usually of more importance. For cutting inserts, wear parts and die tooling, however, fracture toughness and strength become paramount along with resistance to chemical attack. Where wear resistance, resistance to high temperature degradation and chemical attack, strength and fracture toughness are all required along with the ability to form accurate intricate shapes in the ceramic, the problems combine. Such combinations are required for high temperature extrusion and wire drawing dies in particular as well as cutting tools and wear parts for high temperature and corrosive applications.

It would therefore be highly advantageous to produce a ceramic composite material capable of being electro-discharge machined to final shape at high cutting rates for economic reasons. The new composite material should be sufficiently thermal shock resistant to minimize surface damage generated during the electro-discharge machining process while retaining or improving high bulk mechanical properties, in particular high fracture toughness.

SUMMARY OF THE INVENTION

The invention comprises an electro-conductive ceramic specifically developed and tested for high temperature extrusion dies, cutting tools and wear parts. By providing an electro-conductive ceramic, the ceramic can be electro-discharge machined (EDM) to virtually exact shape subsequent to furnace sintering, hot pressing or hot isostatic pressing to the final density and hardness of the ceramic. Thus, complex geometries and features such as holes, chamfers, slots, angles, changing radii and other features can be electro-discharge machined into the die, that could not previously be either economically provided or produced in a ceramic. After the electro-discharge machining, minimal diamond grinding for final dimensionality or surface condition may be provided, if desired for the particular application. Although the ceramic composite is specifically directed to die construction, tooling and wear parts, the properties of the ceramic allow other applications, in particular where intricate shapes are required.

It has been discovered that additions as high as 31 weight percent of an electroconductive compound, such as TiC, may be used to achieve electro-discharge machining cutting rates which are ten times greater than previously achieved without degradation of mechanical properties in the ceramic composite. Importantly, fracture toughness can be substantially improved. The use of properly dispersed SiC whiskers at high percentages to negate the detrimental effects of the electroconductive addition has been apparently overlooked in the past. On a microscopic scale, the use of SiC whiskers as micro-crack arresters fracture toughens the new ceramic composites, however, as disclosed below the size and aspect ratio of the whiskers is of great importance to the success of the new ceramic composites.

The negative effects on strength arising from surface damage in the electro-discharge machining process as noted above with respect to previous composites are overcome with the new high fracture toughness composites allowing utilization of as cut electro-discharge machined surfaces or edges and thin walled sections heretofore not possible. Paramount to eliminating the previous adverse effects of the electro-discharge machining process is the development of high fracture toughness electro-discharge machineable ceramics which exhibit high resistance to thermal shock experienced during the thermal erosion process. Properly dispersed at high volume levels ceramic whiskers of sufficiently small size, low aspect ratio and lacking in impurities, SiC whiskers ($SiC_{(w)}$) produced by recently developed processes, for example, have been identified as critical to achieving the requirements of high fracture toughness and resistance to thermal shock surface damage despite the addition of electro-conductive ceramics well in excess of 20% by weight. As a result thin walls on the order of the electro-discharge wire diameter (0.010 inches) in thickness can be produced that retain the bulk ceramic strength and fracture toughness.

Thus, the invention provides electro-discharge machinable ceramic composites with significantly improved mechanical properties of fracture toughness, strength and hardness over previous electro-conductive ceramic composites and non-electroconductive ceramic composites. Moreover, the new composites provide very economical processing from the high electro-discharge cutting rates permitted, superior surface finish and lack of damage to the machined surfaces.

The new ceramic comprises a base non-conductive ceramic component such as $Al_2O_3$ to which is added sufficient amounts of an electro-conductive ceramic component such as TiC, $TiB_2$, $ZrB_2$ or TiN to achieve an electrical resistance of less than about 10 ohm centimeters specific resistance. In the present invention fracture toughness is improved two to three fold over the individual ceramic components as disclosed below in the test results of Table 1. Strength and hardness may also increase as disclosed below, but are never reduced.

TABLE 1

| Ceramic | Fracture Toughness $K_{1c}$ (MN/m$^{3/2}$) |
|---|---|
| $Al_2O_3$ | 2.5–3.5 |
| TiC | 2.0–3.0 |
| SiC | 3.0–4.0 |
| $Al_2O_3$ + TiC | 4.0–4.5 |
| $Al_2O_3$ + TiC + SiC$_{(w)}$ | 6.5–9.5 |

Thus, the improved mechanical properties of non-electroconductive ceramic composites reinforced with SiC whiskers are retained in an electro-conductive ceramic composite that can be electro-discharge machined with much less surface damage subsequent to sintering or hot pressing. Machining cost compared to diamond grinding or ultrasonic machining is greatly reduced. With surface finishes comparable to diamond grinding, a light final diamond grind is usually optional. Moreover, since electro-discharge machining is a non-contact thermal process, minimal mechanical surface damage is done to the new ceramic composites thereby allowing for the use of features and surfaces as formed by the electro-discharge machining process without further finishing. The thermal shock resistance of the new ceramic composites comprises a distinctive and unexpected result because the very high localized heating with electro-discharge machining causes significant thermal shock damage in previously known electro-conductive ceramics. The thermal shock resistance of the new ceramic composites is believed due to the small size (average 0.6 micron diameter and average less than 10 microns length) SiC whiskers dispersed in the ceramic matrix. Contributing to the thermal shock resistance is the absence of contaminants. The SiC whiskers obtained for the new ceramic composites typically have less than about 0.03% Fe, Co and Cr metallic content. This compares to metallic contamination of 1 to 2% prior to about 1985.

DESCRIPTION OF THE PREFERRED EMBODIMENTS

To produce the ceramic composite of this invention a non-electroconductive ceramic powder such as $Al_2O_3$, $Si_3N_4$, SiC or $ZrO_2$ is selected for the particular future application with the proper purity and particle size for that particular application. The particular ceramic matrix powder depends upon such factors as the future working temperature, impact loading, material being extruded or drawn in die applications, or being cut in machining applications.

To the matrix ceramic powder are added one or more electro-conductive ceramic powders such as TiC, TiN, $TiB_2$, $ZrB_2$ or other metallic carbides, nitrides or borides and the combination mixed and blended by ball or attrition milling in an aqueous or alcohol dispersion carrier. The combination is then dried and sieved or sized as appropriate for the final application. The amount of electro-conductive powder added is at least sufficient to provide for the reasonably free flow of electric current in the electro-discharge machining process. This will normally be sufficient electro-conductive ceramic powder for a specific resistance of less than about 10 ohm-centimeters, however, preferably a much larger amount is added to permit exceptionally fast electro-discharge machining at a rate about ten times faster than the prior art.

Ceramic whiskers are then added to the combination and mechanically distributed in the powder to provide an even dispersion in the ceramic. Optionally, the ceramic whiskers may be distributed for non-isotropic mechanical properties. The whisker component may be one or more ceramic whisker products such as SiC, TiC, $Al_2O_3$, $Si_3N_4$, $TiB_2$, $B_4C$ or mullite ($3Al_2O_3.2SiO_2$) whiskers. The amount of whiskers added is sufficient to overcome the detrimental mechanical effects of the electro-conductive ceramic powders.

Of particular importance is obtaining a predominance of low aspect ratio ceramic whiskers in the densified ceramic composite. In contrast the prior art teaches thoroughly blending and mixing to disperse the whiskers but not to so severely mix as to degrade the whiskers from their as received length and high aspect ratio. Thus, the high aspect ratio ceramic whiskers are retained in the ceramic composite. For example, U.S. Pat. No. 4,507,224 further points out that SiC whisker lengths less than $10_{um}$ are deleterious and a minimum length of $50_{um}$ and a maximum length of $500_{um}$ are preferred.

In this invention a ceramic whisker aspect ratio range of about 5–30 has been found advantageous in producing a high fracture toughness electro-discharge machineable ceramic composite with an aspect ratio range of about 10–20 being preferred. This low aspect ratio results in typical SiC whisker lengths of $5-10_{um}$ for whiskers having an average diameter of $0.5_{um}$. Importantly, this low aspect ratio criteria maximizes the number of individual, discrete whiskers per unit volume of ceramic composite, each individually contributing to toughen the composite through crack arresting mechanisms. Further, the mean-free-path between the whiskers is greatly reduced which results in increased resistance to critical crack formation and propagation. The crack-whisker interaction with the low aspect ratio whiskers rpoduces significant fracture toughening in the composite through crack blunting and other energy dissipating mechanisms.

It is therefore very advantageous to utilize a combination of small diameter ceramic whiskers and low aspect ratio criteria for the whiskers to obtain a high volume fraction of ceramic whiskers in the densified electro-discharge machineable ceramic composite. Simple volumetric comparison calculations serve to determine the number of ceramic whiskers per unit volume, at a fixed volume fraction, for the prior art and for the present invention. From these calculations the reduction in mean-free-path length between whiskers compared to tHat obtained by the prior art can be estimated. As an example these data are shown in the following Table 2.

TABLE 2

| | Average Whisker Diameter $D_{(um)}$ | Average Length, $L_{(um)}$ | Aspect Ratio L/D | Whisker Volume, Each, (Cm$^3$) | Normalized No. of Whiskers Per Unit Volume | Mean-Free-Path Length (um) |
|---|---|---|---|---|---|---|
| New | 0.5 | 5.0 | 10 | $0.9(10^{-6})$ | 100 | 5 |

TABLE 2-continued

| | Average Whisker Diameter $D_{(um)}$ | Average Length. $L_{(um)}$ | Aspect Ratio L/D | Whisker Volume. Each. $(Cm^3)$ | Normalized No. of Whiskers Per Unit Volume | Mean-Free-Path Length (um) |
|---|---|---|---|---|---|---|
| Composite Prior Art | 1.5 | 100.0 | 67 | $0.88(10^{-4})$ | 1 | 100 |

As shown in the above table, the mean-free-path length between reinforcing ceramic whiskers is reduced by a factor of 20 from the prior art. The whiskers on average are well below a generally accepted critical length of $50_{um}$ for high strength ceramics. Even more importantly a mean-free-path crack length greater than $50_{um}$ is deleterious to ceramic composites and prevents development of high strength. With a mean-free-path length of about $5_{um}$ the new composites greatly inhibit the formation of cracks longer than $50_{um}$ whereas in prior art ceramics the mean-free-path length of about $100_{um}$ permits formation of crack lengths greater than $50_{um}$ uninhibited by whiskers. SiC whiskers having the small diameter and low aspect ratio utilized in the new ceramic composites are available from Tokai Carbon Co., Ltd., Tokyo, Japan.

The combination is next formed into a near net shape by a conventional means such as powder pressing into a preform. The powder preform is then subjected to high temperature processing such as furnace sintering, hot pressing or hot isostatic pressing to consolidate, densify and bond the combination together into a ceramic body. A final ceramic equal or better in mechanical properties to the combination or its components absent the electro-conductive ceramic additives is provided. The ceramic body upon cooling can then be electro-discharge machined to the final shape including those complex geometric features that could not be provided in the powder pressing step or high temperature consolidation, densification and bonding step.

Upon completion of the electro-discharge machining, which may comprise one or more steps, a final diamond grinding may be provided on critical surfaces as needed. Very small holes and undercuts which cannot be formed prior to the high temperature processing step can be advantageously formed with electro-discharge machining.

An important reason for the lack of penetration of high strength, engineered ceramics in commercial markets is the great difficulty and therefore high cost of forming complex shapes in either the pre-or-post high temperature consolidation step of the manufacture of the ceramics. The new whisker reinforced electrically conductive ceramic composition provides a fully dense material with optimal mechanical properties that can also be formed into much more complex shapes than heretofore economically possible. The capability of electro-discharge machining obtains good surface quality, chip-free edges, dimensional accuracy and complex shapes.

The surface quality obtainable with electro-discharge machining of the new composite is comparable with the best conventional methods of obtaining a high quality surface finish. For example, a billet of the new $Al_2O_3$-TiC-SiC whisker ceramic composite was cut by a traveling wire electro-discharge machine under the following conditions:

Raycon EDM — Model HS300
Billet thickness — 0.340 inches
Brass Wire dia. — 0.010 inches
Cutting speed — 0.150-0.240 inches per minute
Sparking time — 36 Micro-seconds
Spark energy — 67% of maximum
Available power — 75%
Total time in cut — 30 minutes
Operator attended — No The as cut electro-discharge machined surface obtained under the above conditions produced, with minimal removal of material (on the order of 0.0003-0.0005 inches), a surface finish of 16 micro-inches. This surface finish is comparable to surface finishes obtained by costly diamond grinding processes.

The electro-discharge cutting speeds of the new ceramic composite compare with the electro-discharge cutting speeds of typical tool steels and exceed the cutting speeds typically used to cut carbide materials. Moreover, the new ceramic composite does not exhibit edge chipping or a limitation with respect to minimum electrodischarge machined section thickness. For example, the new ceramic composites can be cut to a section on the order of the electro-discharge wire diameter (0.010 inches) and a 0.130 inches section can be cut at 0.394 inches per minute.

Dies for extruding brass at high temperature have been constructed in the above manner and extensively tested as follows:

Extrusion dies were constructed of $Al_2O_3$, 39% by volume powder, TiC, 24% by volume powder and SiC whiskers, 37% by volume in accordance with the above combining process and hot pressed to ceramic bodies externally approximating the size of the end product to be processed. The ceramic bodies were then electro-discharge machined to extrude 7/8 inch and 9/16 inch face to face hexagonal bar stock. A final diamond dressing was performed on the die exterior surfaces that contact the metal die holder.

The tests have comprised the extrusion of 10 inch diameter brass billets at 1375° F. with the hexagonal bar stock formed at a rate of 400 Ft. per minute. About 600 ft. of bar stock are produced per billet. The tests have shown in excess of 300 billets can be extruded to about 180,000 feet of extruded hexagonal bar stock without excessive die wear. Importantly, the new ceramic maintains its strength, toughness and wear resistance at relatively high temperature. In comparison, high temperature metallic alloy extrusion dies fail from wear at 50 to 100 billets.

As a second example the feeder system of a metal powder compacting press was retrofitted with sliding hardware, in particular, the powder feeder base and anvil base, of the new $Al_2O_3$-TiC-SiC whisker composite above to evaluate the wear resistance of the new composite in a mutual sliding wear application.

In the particular application an abrasive metal powder is compacted into small pellets. Previous attempts to use hardened tool steel or carbide for the feeder base and anvil were unsuccessful because the metal powder system contained mercury (Hg) sufficient to cause sticking and residue build-up on the sliding surfaces. Replacement of the feeder base and anvil is required when abrasive wear reaches 0.001-0.002 inches on the sliding surfaces and the resulting residue build-up inhibits the die pressing motion.

From experience a 50,000 cycle feeder base and anvil test which shows measurable wear will result in unacceptable performance at 500,000 cycles due to excess residue, and build-up of the metal powder on the sliding surfaces. Normal replacement of the wear parts is desired only after 500,000-1,000,000 cycles.

In an attempt to improve performance a commercially available silicon nitride (Norton-NC 132) was also evaluated for the application, however, a measurable wear of 0.00015 inches after 50,000 cycles resulted. Thus, excessive wear would occur after about 500,000 cycles.

Conversely, the new ceramic composite prepared with electro-discharge machining exhibited negligible wear on the order of 1-2 micro-inches after 50,000 cycles. This is an improvement factor of about 100 over the silicon nitride. Over the duration of the test, the wear parts of the new ceramic composition were free of residue or build-up of metal powder. Moreover, the new composite provides the added ability to electro-discharge machine internal features such as the filler cavity for the powder metal. Since electro-discharge machining for hard wear parts is very cost effective, an important additional economic benefit is present.

As a third example, the new $Al_2O_3$-TiC-SiC whisker composite was tested as a cutting tool to machine IN-718 nickel-base superalloy. The composite was formed and electro-discharge machined to a standard size RNG-45 style cutting insert. The sharp electro-discharge machined edge of the tool was used to cut the superalloy without any further dressing. Usually, an edge chamfer (known as K-land or T-land) is diamond machined on the ceramic edge to increase edge strength and obtain longer tool life.

However, use of the electro-discharge machined cutting tool edge without further treatment served to evaluate both the edge strength of the new composite and the edge quality achieved through the electro-discharge process. The machining parameters employed were 600 surface feet per minute (SFM), 0.010 inches per revolution feed (IPR) and a 0.030 inches depth of cut (DOC). These cutting conditions are 5 to 8 times the rate of metal removal with carbide tools. Moreover, the machining performance compared to silicon nitride tools was 200% better indicating that the tool cutting edge was not degraded by electro-discharge induced cracking. Thus, the new electro-discharge machined cutting tool composite has excellent inherent edge strength. The cutting tool composite was prepared and tested as follows:

To an alumina powder having a nominal 0.5 micron average particle diameter, 25 volume percent SiC whiskers (0.1-0.8 microns diameter and 5-50 microns length) and 25 volume percent TiC were added and thoroughly mixed. The composition was hot pressed at 3272° F. and 4000 pounds per square inch pressure for 60 minutes achieving a 99.5% theoretical density.

This composition was electro-discharge machined at 0.236 inches per minute through a 0.340 inches thick section to form a cutting tool that was successfully tested as described above. Room temperature strength was found to be 70 kips per square inch and hardness 2200 (HV) obtained.

To an alumina powder having a nominal 0.5 micron average particle diameter, 25 volume percent SiC whiskers (0.1-0.8 micron diameter and 5-50 microns length) and 25 volume percent $TiB_2$ were added and thoroughly mixed. This composition was hot pressed at 3272° F. and 4000 pounds per square inch for 60 minutes achieving 99.6% theoretical density.

This composition was electro-discharge machined at 0.118 inches per minute through a 0.340 inches thick section. The hardness obtained was 2200 (HV). This composition was prepared for a comparison of electro-discharge machining speed and hardness.

Repeating the above processing but with 37 volume percent SiC whiskers and about 21.6 volume percent TiC a density of 99.5% theoretical was achieved for the extrusion die as above described. The composition was electro-discharge machined at 0.236 inches per minute through a 0.340 inches thick section with a strength of 94 kips per square inch and a hardness of 2400 HV achieved in a test specimen preparatory to the die manufacture.

The compositions of three of the above new ceramic composites can be summarized as follows in Table 3.

TABLE 3

|  | WT. % | VOL. % |
|---|---|---|
| 37% SiC(w) | | |
| $Al_2O_3$ | 42.5 | 41.8 |
| TiC | ~26.6 | ~21.6 |
| SiC(w) | ~30.0 | 36.5 |
| 25% SiC(w) | | |
| $Al_2O_3$ | 49.9 | 50.0 |
| TiC | ~30.0 | 25.0 |
| SiC(w) | 20.0 | 25.0 |
| 35% SiC(w) | | |
| $Al_2O_3$ | 40.9 | 40.0 |
| TiC | ~31.0 | 25.0 |
| SiC(w) | 28.0 | 35.0 |

I claim:

1. An electro-discharge machineable ceramic composite consisting of at least one non-electroconductive ceramic component, at least one electro-conductive ceramic component and at least one ceramic whisker component, said electro-conductive component in excess of 20% by weight to provide sufficient electro-conductivity of the ceramic composite for a superior electro-discharge machining rate of the ceramic composite and said ceramic whiskers averaging less than 10 microns in length with aspect ratios averaging less than 30 and in sufficient volume in the composite to provide a mean free path length between whiskers substantially equal to said average length of the whiskers.

2. The ceramic composite of claim 1 consisting of 35-60 volume percent of $Al_2O_3$, 20-30 volume percent of TiC and 10-50 volume percent of SiC whiskers.

3. The ceramic composite of claim 1 consisting of a ceramic component selected from the group $Al_2O_3$, $Si_3N_4$, SiC and $ZrO_2$; an electro-conductive ceramic component selected from the group TiC, TiN, $TiB_2$, and $ZrB_2$; and a ceramic whisker component selected from the group SiC, $Si_3N_4$, $Al_2O_3$, TiC, $B_4C$ and mullite $(3Al_2O_3 \cdot 2SiO_2)$ whiskers.

4. The electro-discharge machineable ceramic composite of claim 1 wherein the ceramic whiskers average about 0.6 microns in diameter.

5. A ceramic composite extrusion die body having an extrusion forming aperture therethrough consisting of a non-electroconductive ceramic component, an electroconductive ceramic component and a ceramic whisker component, as claimed in claim 1, said die body formed by electro-discharge machining the ceramic composite to final die shape subsequent to hot processing to consolidate, densify and bond the ceramic composite into a hard body.

6. The ceramic composite extrusion die of claim 5 consisting of 35–60 volume percent of $Al_2O_3$, 20–30 volume percent of TiC and 10–50 volume percent of SiC whiskers.

7. The ceramic composite extrusion die of claim 5 consisting of a ceramic component selected from the group $Al_2O_3$, $Si_3N_4$, SiC and $ZrO_2$; an electro-conductive ceramic component selected from the group TiC, TiN, $TiB_2$ and $ZrB_2$; and a ceramic whisker component selected from the group SiC, $Si_3N_4$, $Al_2O_3$, TiC, $B_4C$ and mullite ($3Al_2O_3.2SiO_2$) whiskers.

8. The ceramic composite extrusion die of claim 5 wherein the ceramic whiskers average about 0.6 microns in diameter.

9. A ceramic composite wear part body having at least one specific wear surface thereon consisting of a non-electroconductive ceramic component, an electro-conductive ceramic component and a ceramic whisker component, as claimed in claim 1, said wear part body formed by electro-discharge machining the ceramic composite wear surface(s) to final surface finish subsequent to hot processing to consolidate, densify and bond the ceramic composite into a hard body.

10. The ceramic composite wear part of claim 9 consisting of 35–60 volume percent of $Al_2O_3$, 20–30 volume percent of TiC and 10–50 volume percent of SiC whiskers.

11. The ceramic composite wear part of claim 9 consisting of a ceramic component selected from the group $Al_2O_3$, $Si_3N_4$, SiC and $ZrO_2$; an electro-conductive ceramic component selected from the group TiC, TiN, $TiB_2$ and $ZrB_2$; and a ceramic whisker component selected from the group SiC, $Si_3N_4$, $Al_2O_3$, TiC, $B_4C$ and mullite ($3Al_2O_3.2SiO_2$) whiskers.

12. The ceramic composite wear part of claim 9 wherein the ceramic whiskers average about 0.6 microns in diameter.

13. A ceramic composite cutting tool insert body having a rakeface, a flank face and a cutting edge at the juncture therebetween consisting of a non-electroconductive ceramic component, an electroconductive ceramic component and a ceramic whisker component, as claimed in claim 1, said cutting tool body formed by electro-discharge machining the ceramic composite cutting tool to final shape and surface finish subsequent to hot processing to consolidate, densify and bond the ceramic composite into a hard body.

14. The ceramic composite cutting tool of claim 13 consisting of 35–60 volume percent of $Al_2O_3$, 20–30 volume percent of TiC and 10–50 volume percent of SiC whiskers.

15. The ceramic composite cutting tool of claim 13 consisting of a ceramic component selected from the group $Al_2O_3$, $Si_3N_4$, SiC and $ZrO_2$; an electro-conductive ceramic component selected from the group TiC, TiN, $TiB_2$ and $ZrB_2$; and a ceramic whisker component selected from the group SiC, $Si_3N_4$, $Al_2O_3$, TiC, $B_4C$ and mullite ($3Al_2O_3.2SiO_2$) whiskers.

16. The ceramic composite cutting tool of claim 13 wherein the ceramic whiskers average about 0.6 microns in diameter.

17. An electro-discharge machineable ceramic composite consisting of at least one non-electroconductive ceramic component, at least one electro-conductive ceramic component and 10–50% by volume of at least one ceramic whisker component consisting of ceramic whiskers averaging less than 10 microns in length with aspect ratios averaging less than 30 and in sufficient volume in the composite to provide a mean free path length between whiskers substantially equal to said average length of the whiskers.

18. The electro-discharge machineable ceramic composite of claim 17 wherein said electro-conductive component exceeds 20% by weight.

19. The electro-discharge machineable ceramic composite of claim 17 wherein the metallic contaminants of the ceramic whisker component are less than 0.1%.

20. An electro-discharge machineable ceramic composite consisting of at least one non-electroconductive ceramic component, at least one electro-conductive ceramic component in excess of 20% by weight and at least one ceramic whisker component, the ceramic whisker component consisting of ceramic whiskers averaging less than 10 microns in length with less than 0.1% metallic contaminants and in sufficient volume in the composite to provide a mean free path length between whiskers substantially equal to said average length of the whiskers.

* * * * *